United States Patent
Cruzado Parla et al.

(10) Patent No.: US 9,944,025 B2
(45) Date of Patent: Apr. 17, 2018

(54) METHOD FOR MANUFACTURING ROWINGS OF COMPOSITE MATERIALS

(71) Applicant: AIRBUS OPERATIONS, S.L., Getafe (Madrid) (ES)

(72) Inventors: Gabriel Cruzado Parla, Getafe (ES); Pablo Lopez Fernandez, Getafe (ES); Aitor Echevarria Hernandez, Getafe (ES); Alberto Martinez Cerezo, Getafe (ES); Alberto Mulas De Lamo, Getafe (ES); Maria Mora Medias, Getafe (ES)

(73) Assignee: AIRBUS OPERATIONS, S.L., Getafe (Madrid) (ES)

( * ) Notice: Subject to any disclaimer, the term of this patent is extended or adjusted under 35 U.S.C. 154(b) by 0 days.

(21) Appl. No.: 14/982,039

(22) Filed: Dec. 29, 2015

(65) Prior Publication Data
US 2017/0144385 A1  May 25, 2017

(30) Foreign Application Priority Data
Dec. 30, 2014  (EP) .................................... 14382583

(51) Int. Cl.
*B29C 70/38* (2006.01)
*B29L 31/06* (2006.01)

(52) U.S. Cl.
CPC .......... *B29C 70/382* (2013.01); *B29C 70/386* (2013.01); *B29L 2031/06* (2013.01)

(58) Field of Classification Search
CPC .. B29C 70/382; B29C 70/386; B29L 2031/06
See application file for complete search history.

(56) References Cited

U.S. PATENT DOCUMENTS 5,098,240 A * 3/1992 Gapp ............................ 411/424
5,397,415 A * 3/1995 Manabe ........................ 156/234
(Continued)

FOREIGN PATENT DOCUMENTS

EP  2764987 A1  8/2014
FR  2913747     9/2008
(Continued)

OTHER PUBLICATIONS

European Search Report dated Jul. 24, 2015, 8 Pages.

*Primary Examiner* — Mark A Osele
*Assistant Examiner* — Christopher C Caillouet
(74) *Attorney, Agent, or Firm* — John S. Artz; Dickinson Wright PLLC

(57) ABSTRACT

The disclosure refers to a method for manufacturing rod-shaped components of composite material, for example rowings or fillers, wherein a laminate is layered by automatically laying up a plurality of plies of composite material, which is then cut in an automated machine to obtain a plurality of rods having substantially the same cross-sectional shape. The obtained rods are then simultaneously conformed by applying heat and pressure to obtain rods with the desired cross-sectional shape. With the method of the disclosure, a large number of these types of components are produced with improved quality and in a very simple manner, using the machinery and equipment already commonly existing in a factory of aeronautic components.

9 Claims, 5 Drawing Sheets

(56) References Cited

U.S. PATENT DOCUMENTS 5,954,898 A * 9/1999 McKague .................... 156/64
2007/0175171 A1 8/2007 Delgado et al.

FOREIGN PATENT DOCUMENTS

| GB | 1204002 | | 9/1970 |
|---|---|---|---|
| WO | 0220248 | A1 | 3/2002 |
| WO | 2014200393 | A1 | 12/2014 |

* cited by examiner

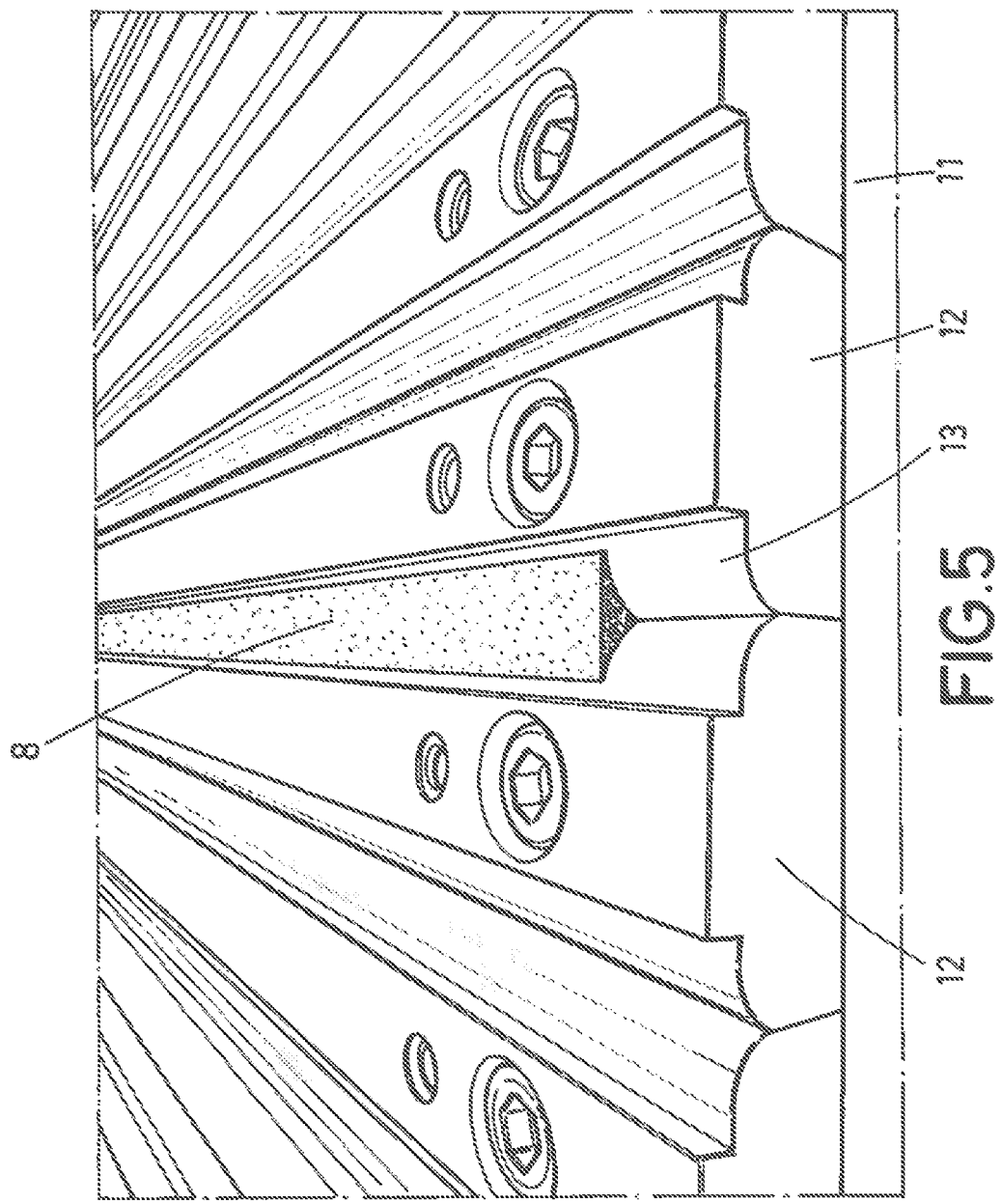

METHOD FOR MANUFACTURING ROWINGS OF COMPOSITE MATERIALS

CROSS-REFERENCE TO RELATED DISCLOSURES

The present disclosure claims priority to European Disclosure No. 14382583.4 filed on Dec. 30, 2014, which is hereby incorporated by reference, as though set forth fully herein.

FIELD OF DISCLOSURE

The present disclosure refers in general to the manufacture of components of composite material, such as carbon-fiber-reinforced-plastics (CFRP). More particularly, the disclosure refers to a method for manufacturing composite components in the form of a rod, such as rowings or fillers, commonly used in the aeronautical industry for constructing stringer reinforced structures.

An object of the present disclosure is to provide a manufacturing method for producing rod-shaped components of the above type, in large quantities, with improved quality, and in a very simple manner in order to reduce production cost, by using the machinery and equipment typically existing in a factory of aeronautic components, that is, reducing the need of constructing dedicated equipment for manufacturing these rod-shaped components.

BACKGROUND OF THE DISCLOSURE

In the aeronautical industry, it is generally known to reinforce fuselage skin panels with several types of stringers: such as T, U, J and omega-shaped stringers, in order to withstand the high loads that an aircraft has to withstand during flight, take offs, and landings.

FIGS. 1A and 1B show two different types of stringers joined to a skin panel. In the case of FIG. 1A, a "T-shaped" stringer (2) is joined to a skin panel (1), and in the case of FIG. 1B, an omega-shaped stringer (2) is joined to a skin panel (1). These two elements, panel and stringer, are joined either by co-curing both elements together, by co-bonding one element to the other, or by secondary bonding both elements.

In can be observed in FIG. 1A, that the cavity defined between the stringer (2) and the skin panel (1), is filled with a third element usually called rowing or filler (3), which is integrated in the structure during its manufacture. In the case of the omega stringer of FIG. 2B, two rowings (3) are used to fill the cavity defined between the stringer (2) and the skin panel (1).

The main purpose of these rowings is to fill the cavities generated during the manufacturing process to facilitate consolidation of the carbon fiber layers the stringer and panel during the curing process. Furthermore, these rowings serve to minimize the formation of cracks, and to minimize damages in vacuum bags during the consolidation process.

Manufacturing of these rowing is both time-consuming and expensive, because they have to be produced in large quantities, and there are no machines especially adapted for their manufacture is an automated manner. This means that currently, the manufacture of these rowing involves many manual steps, which is not only slow but also originate quality problems, since the repetitiveness of the desired shape of the rowing cannot be assured.

FIGS. 2A-2E shows various illustrations of a conventional process for producing these rowings. First, a sheet of carbon fiber is manually cut (FIG. 2A) to form strips of carbon fiber, which are then manually rolled-up one by one to form a rolls of carbon fiber (FIG. 2B). A set of rolls are then placed individually in a conforming tool (FIG. 2B), provided for that purpose with a plurality of channels or grooves to accommodate each roll.

This conforming tool is part of a press, which is used to conform the rolls by the simultaneous disclosure of pressure and heat (FIGS. 2D and 2E). The disclosure of pressure may be carried out by generating vacuum inside a membrane inside which the rowing are placed.

As it can be appreciated clearly from FIGS. 2A-2E, the current process for producing these rowings is slow because involves several manual operations, and the quality of the finished component depends on the skills of a human operator.

SUMMARY OF THE DISCLOSURE

One aspect of the disclosure refers to a manufacturing method for obtaining rod-shaped components of composite material in large quantities, wherein these rods are suitable to be used as rowings or fillers for constructing structures based on stringers reinforced structures.

The method includes the steps of forming a laminate of carbon fiber in a similar manner as to produce a skin panel, for example by means of an Automated Tape Laying (ATL) machine or by means of an Automated Fiber Placement machine. In this automatic process, a plurality of plies of composite material, preferably Carbon Fiber Reinforced Plastic (CFRP), are layered up in different directions on a flat supporting surface, as to form a laminate with substantially constant thickness in a major part of the same or more preferably in the entire laminate.

Once the laminate has been layered, it is transferred to an automatic cutting machine where the laminate is cut following several predefined parallel cutting lines (in one aspect, at the same time), so as to divide the laminate in rods of composite material having the same length and substantially the same cross-sectional shape. For that, the thickness of the laminate and the distance between consecutive cutting lines are selected to obtain rods, for example with substantially squared or a rectangular cross-sectional shape.

Finally, a set of rods obtained in the previous step, still in an uncured state, are simultaneously conformed by applying pressure and heat to obtain rods conformed with the desired cross-sectional shape.

For conforming the rods, a press, for example a hydraulic, pneumatic or mechanic press or even a vacuum press, is provided with a surface having a plurality of molds in the form of elongated channels with the desired shape for the rods, wherein the channels are arranged parallel to each other. The rods obtained after the cutting step, are then placed individually in said channels and then, the rods are pressed against those channels, at the same time that the rods are heated up, such as the rods takes the form of a part of the mold.

The temperature and the time that the rods are treated in the press, is selected such as the rods are conformed in a uncured state, since in most of the disclosures the rods or rowing will be co-cured with the stringer and/or the skin panel.

Once the conforming process has been completed, the rowings or fillers are cooled down by forced cooling (air or water), but always maintaining the rowings within the closed press, so that, rowings are not deformed during the cooling process. Once the rowings are cooled down to ambient temperature, then they can be removed from the press without any risk of being deformed.

Therefore, a set of rods of composite material are produced with the desired shape, in a very simple manner and using equipment already existing in most of the factories for manufacturing composite components for the aeronautical industry.

In addition, the disclosure provides the following advantages:
the project is automated, such as manual operations are reduced,
the rowings are provided with perfect, suitable and repetitive section and geometry, such the number of defective pieces and inspection time is reduced, and
recurrent costs are reduced.

BRIEF DESCRIPTION OF THE FIGURES

Various aspects of the disclosure are henceforth described with reference to the accompanying Figures, in which:

FIGS. 1A and 1B show in a cross-sectional view, two different types of stringers joined to a skin panel, according to the prior art, wherein FIG. 1A shows a "T-shaped" stringer, and FIG. 1B shows an omega stringer. The circles in the figure identify the conventional position of the rowings between the panel and the stringer;

FIG. 5 is a perspective view of an enlarged detail of a conformed rowing in the press of FIG. 4 according to the present disclosure.

DETAILED DESCRIPTION OF THE PRESENT DISCLOSURE

FIGS. 3A-3G illustrate a process for producing rowings according to the present disclosure, wherein first an Automated Tape Laying (ATL) (4) is programmed to form on a flat surface (6) a laminate (5) of substantially constant thickness (FIG. 3A), by automatically laying up a plurality of plies of (CFRP), in a known manner.

Figure 3A:
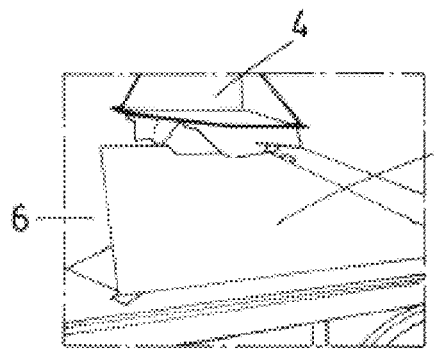
FIGS. 3A-3G show various illustrations of a process for producing rowings according to the present disclosure.
Figure 3B:
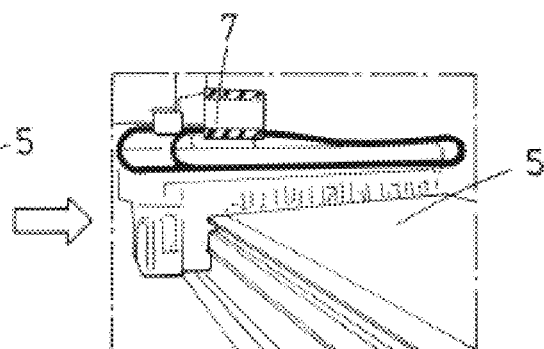
Figure 3C:
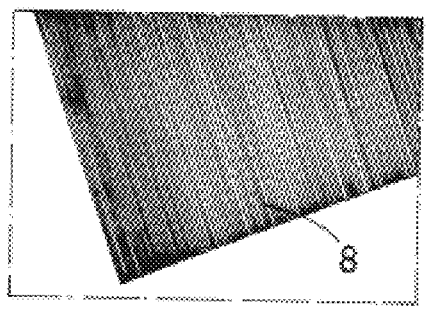
Figure 3D:
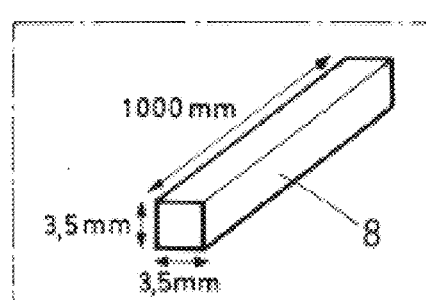
Figure 3E:
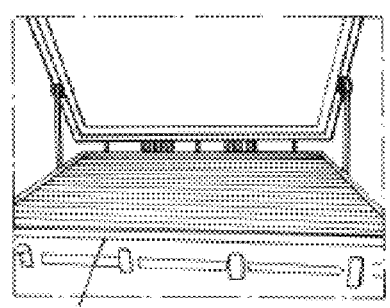

The laminate (5) is layered with a rectangular shape, and it is then transferred an automatic cutting machine (7) (FIG. 3B), for example a numerical control machine, where it is cut following a plurality of parallel cutting lines extending from one of the shorter sides to the opposite shorter side of the laminate. By cutting the laminate in that manner, a plurality of rods (8) of (CFRP) are obtained (FIG. 3C), all of them having substantially the same length and the cross-sectional shape. In this example with a squared cross-sectional shape as shown in FIG. 3D.

In another aspect, other cross-sectional shapes would be suitable for other practical disclosures.

The set of rods (8) is then transferred to a hot-forming press (9) (FIG. 3E), wherein all the rods are simultaneously conformed by applying heat and pressure to obtain rods with the desired cross-sectional shape.

Figure 3F:
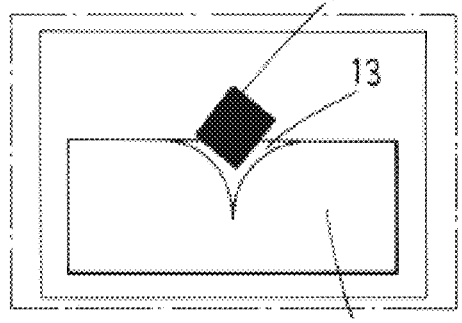
Figure 3H:
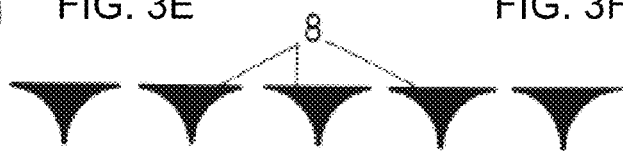
Figure 4:
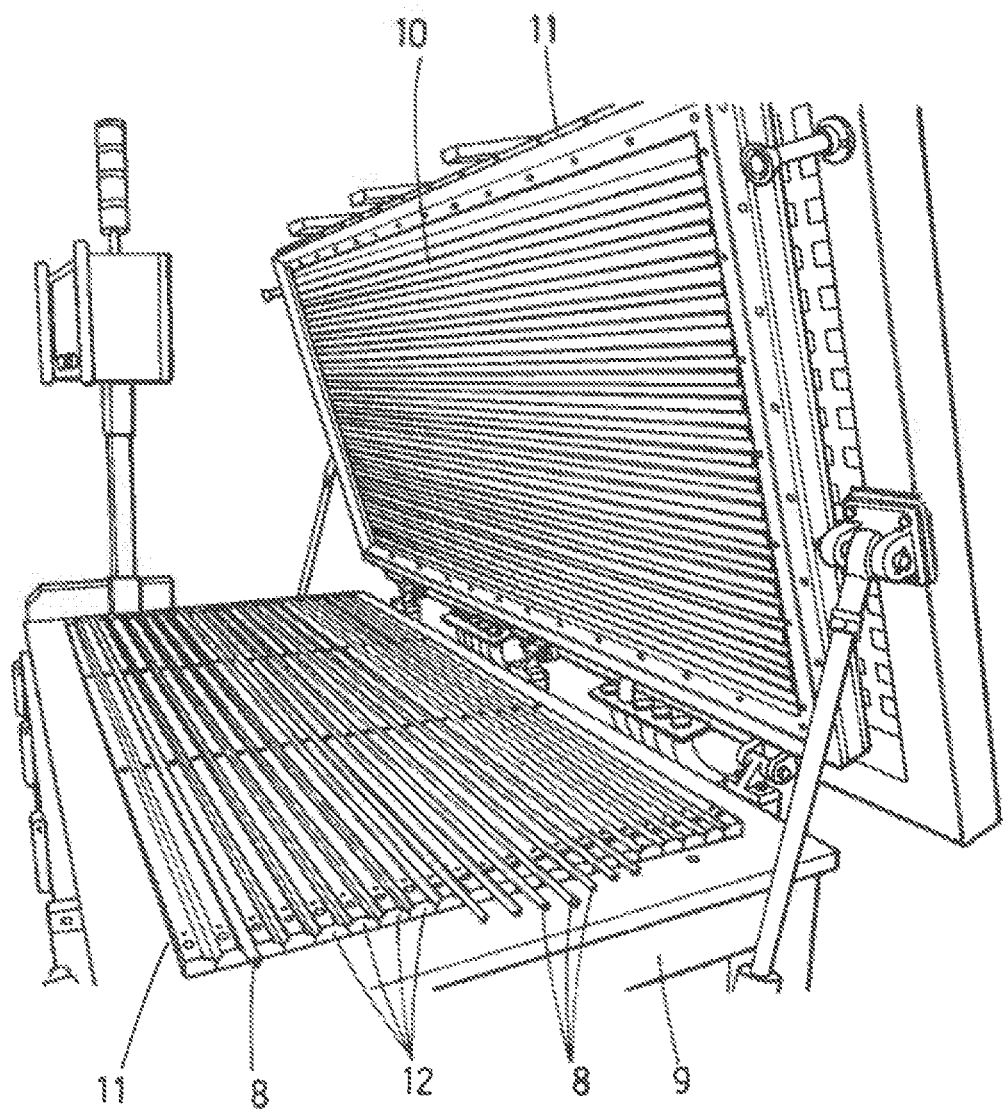
FIG. 4 is a perspective view of a hot-forming press, adapted for conforming at the same time a plurality of rowings according to the present disclosure.

The hot-forming press (9) adapted to implement the method of the present disclosure, is shown in more detail in FIGS. 4 and 5, which is fitted with heating means and control means. The press (9) is formed by a bottom plate (11) and an upper plate (11') closable against the bottom plate for pressing the rods. In the bottom plate (11), a plurality of exchangeable inserts (12) are mounted which are conformed to define a group of molds (13), as shown in FIG. 3F, with the shape of elongated channels are parallel to each other, these channels having the desired shape (FIG. 3G) for the rowings.

On the other hand, in the interior surface of upper plate (11'), a plurality of male protrusions (10) with the form of bars, are provided in correspondence with the shape and positions of the molds (13).

In the manufacturing process, a set of rods are placed on the bottom plate (11) of the press (9), such each rod (8) is individually received within a mold (13) as shown more clearly in FIG. 3F. The upper plate (11') is pressed against the bottom plate (11), such as the rods (8) are heated and conformed with the shape of the channel (13) as shown in FIG. 5.

Once the conforming process has been completed, the rowings or fillers are cooled down by forced cooling (air or water), but always maintaining the rowings within the closed press, so that, rowings are not deformed during the cooling process. Once the rowings are cooled down to ambient temperature, then they can be removed from the press without any risk of being deformed.

A plurality of conformed rods (8) are thereby obtained in a simple and fast manner, all the rods having the same cross-sectional triangular configuration, with two concave sides and one planar side. Obviously, for obtaining rods with other configurations and/or dimensions, the inserts (12) of the press are replaced by other inserts configured with the desired shape.

Figure 1A:
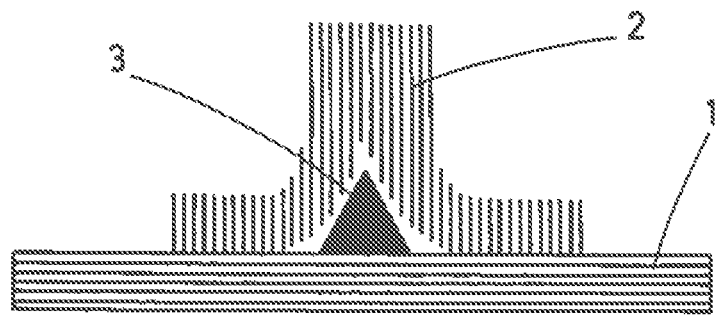
Figure 1B:
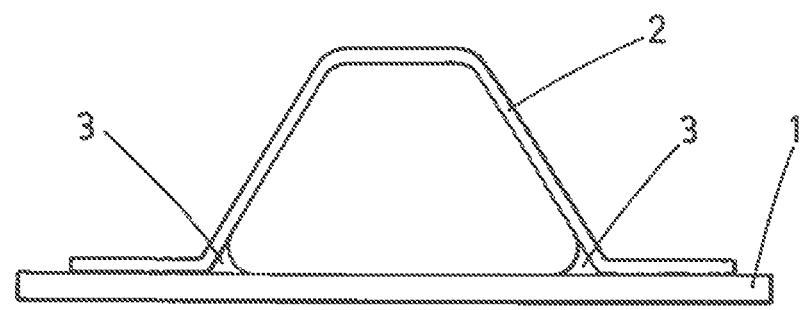
Figures 2A, 2B, 2C, 2D, 2E:
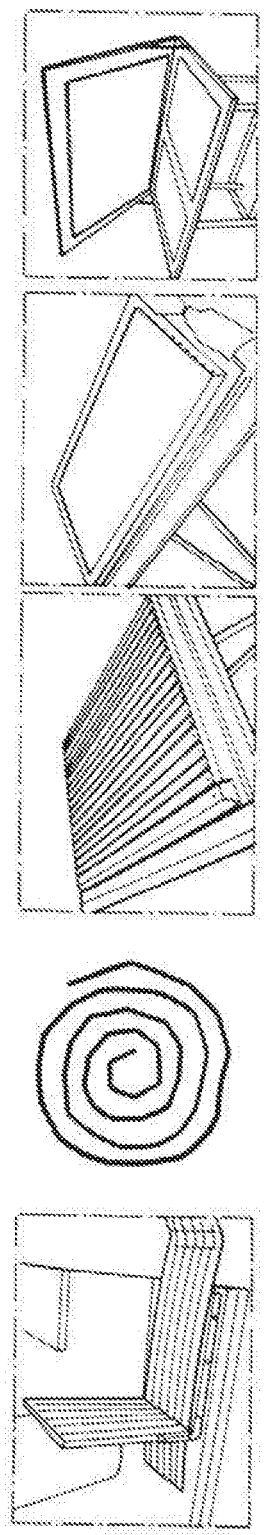
FIGS. 2A-2E show various illustrations of a process for producing rowings according to the prior art.

The conformed rods can be used as rowings for constructing a stringer reinforced structure as depicted in FIGS. 1A and 1B, for example after placing the rowing in the desired position, the rowings are co-cured with the stringer and/or the skin plate.

Other aspects of the present disclosure are described in the appended dependent claims and the multiple combinations of those claims.

What is claimed:

1. A method for manufacturing rod-shaped components of composite material, the method comprising the following steps:
   layering a laminate of substantially constant thickness, by laying up on a flat surface a plurality of plies of composite material in an uncured state;
   cutting the laminate along parallel cutting lines so as to divide the laminate into rods of composite material having substantially the same cross-sectional shape, wherein cutting the laminate is performed by an automatic cutting machine and wherein the rods of composite material are in an uncured state,
   simultaneously conforming a set of the rods obtained in the previous step, by applying heat and pressure for a period of time in a press to obtain rods with a desired conformed cross-sectional shape, the time and temperature selected to result in conformation of the rods to the desired cross-sectional shape but insufficient to result in curing of the conformed rods; and
   cooling the rods to ambient temperature while maintaining them in the press, the conformed rods remaining in an uncured state.

2. The method according to claim 1, wherein the thickness of the laminate and a distance between consecutive cutting lines are selected, such as to obtain rods with substantially square or rectangular cross-sectional shape.

3. The method according to claim 1, wherein the laminate is formed by one of an Automated Tape Laying (ATL) machine and an Automated Fiber Placement machine.

4. The method according to claim 1, wherein the laminate is formed with a rectangular shape and the cutting lines extends longitudinally from one of the shorter sides to the opposite shorter side of the rectangular shape.

5. The method according to claim 1, wherein the rods are conformed in a press provided with a plurality of elongated channels having the desired shape for the rods and parallely arranged in the press, and wherein the method further comprises the step of individually placing rods in said channels and simultaneously pressing the rods against those channels.

6. The method according to claim 1, wherein the composite material is Carbon Fiber Reinforced Plastic (CFRP).

7. The method according to claim 1, wherein the rods of composite material are conformed with a substantially triangular cross-sectional configuration.

8. The method according to claim 7, wherein at least one side of the triangular cross-sectional configuration of the conformed rods is concave.

9. The method according to claim 1, wherein the rods are used as rowings for a structure having stringers joined to skin panels.

* * * * *